Aug. 29, 1933.  A. J. NOWAK  1,924,723
AUTOMATIC CLUTCH
Filed May 9, 1932
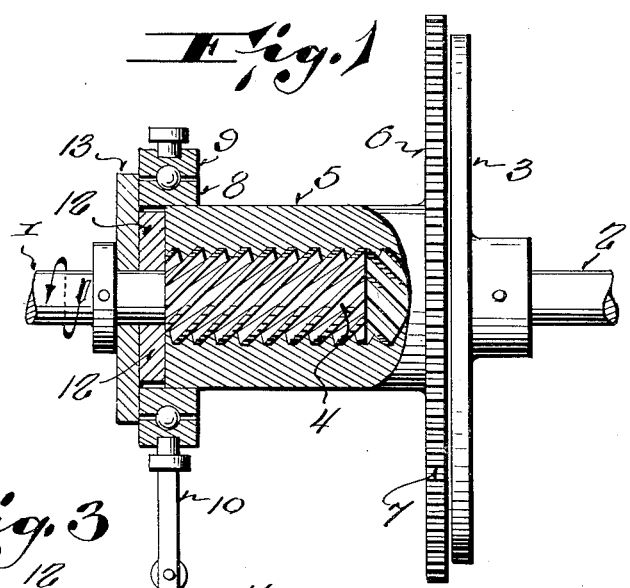
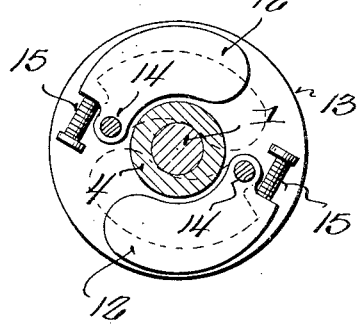
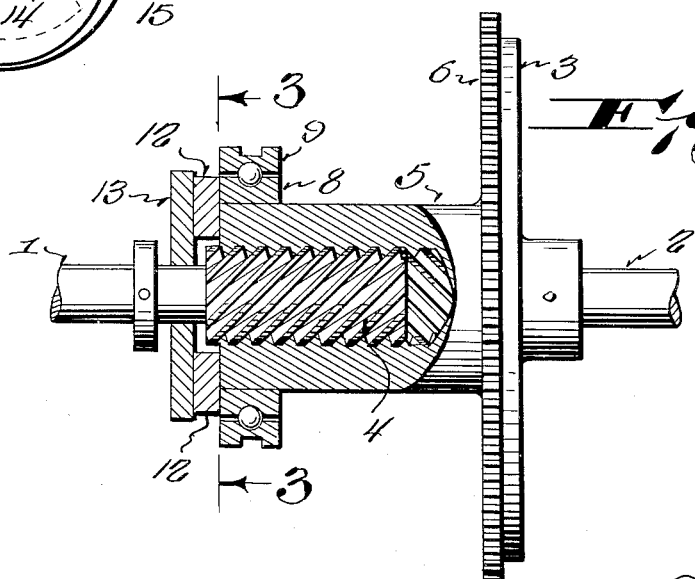
Inventor
A. J. Nowak
By Young & Young
Attorneys Patented Aug. 29, 1933

1,924,723

UNITED STATES PATENT OFFICE 1,924,723

AUTOMATIC CLUTCH

Alexander J. Nowak, Milwaukee, Wis.

Application May 9, 1932. Serial No. 610,005

6 Claims. (Cl. 192—41)

This invention pertains to an automatic clutch, and more particularly to a clutch designed for use in automotive vehicles.

The invention has primarily for its object to provide an exceedingly simple and inexpensive clutch structure, which will automatically effect clutching engagement between the driving and driven shafts, and which will disengage itself when the speed of the driven shaft exceeds that of the drive shaft, thus providing what is termed "free-wheeling" in motor vehicles, and at the same time eliminating manual actuation of the clutch.

Incidental to the foregoing, a more specific object of the invention resides in the provision of a clutch in which one of the clutch members is mounted upon a worm carried by the driving shaft, and which imparts longitudinal reciprocative movement to said member for engagement or disengagement of the clutch, in the event of relative difference in speed of the driving and driven shafts.

A further object in connection with a clutch of the foregoing character resides in the provision of means for automatically locking the clutch against engagement upon discontinuance of rotation of the drive shaft, said means being manually releasable to again effect automatic actuation of the clutch.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:—

Figure 1 is an elevation of a clutch constructed in accordance with the present invention, parts being broken away and in section to more clearly illustrate structural details.

Figure 2 is a similar view illustrating the parts in operative position, and

Figure 3 is a transverse section taken on the line 3—3 of Figure 2, illustrating the centrifugal locking means for rendering the clutch inoperative.

Referring now more particularly to the accompanying drawing, the form of the invention illustrated is designed particularly for use in connection with the drive shaft 1 and the driven shaft 2 of an automotive vehicle, in which instance the shaft 1 would constitute the crank shaft of the motor, while the shaft 2 would be suitably connected with the usual transmission. However, it is to be understood that the present invention may have other applications. Therefore, the same is not to be limited to automotive vehicles.

Secured on the driven shaft 2 is a clutch member 3, which, in the present instance, is illustrated as a disc. However, it is to be understood that any form of clutch may be employed, such as a cone or friction clutch, without departing from the invention. Carried by the drive shaft 1, and either formed integral therewith or secured thereto, is a worm 4, preferably having a fast thread in order to provide for rapid actuation of the clutch and eliminate undue binding or sticking, as will be hereinafter explained. Mounted on the worm is a hub 5, which is interiorly threaded to receive the worm, and thus provide for longitudinal reciprocative action thereon. The outer end of the hub 5 carries a second clutch member 6, also in the form of a disc, and provided with peripheral teeth 7 for engagement with the pinion of a conventional engine starter, not shown. As shown in the drawing, the drive and driven shafts are coaxial, and therefore the clutch plate 6 opposes the disc 3 and effects operative engagement therewith upon reciprocative movement of the hub 5 on the worm 4.

In operation it will be readily apparent that as the shaft 1 is rotated in the direction indicated by the arrow, the hub 5 will be caused to run out on the worm 4, which will effect clutching engagement between the plate 6 and disc 3, imparting rotary movement to the driven shaft 2. In the event that the momentum of the vehicle increases the speed of the shaft 2 over that of the drive shaft 1, the result will be to momentarily advance the plate 6, causing the hub 5 to be run back on the worm 4, thus releasing the clutch.

When the motor is cut off, and rotation of the shaft 1 ceases, it is desirable to effect immediate disengagement of the clutch for the reasons hereinafter set forth, and therefore a collar 8 is slidably mounted on the hub 5, the same serving as a ball race for the spanner sleeve 9, which is engaged by the spanner 10, the latter being urged in one direction by the spring 11 to cause the hub 5 to be reciprocated on the worm and withdraw the plate 6 from engagement with the disc 3.

Also, when rotation of the shaft 1 is stopped, it is desired to automatically lock the clutch against further operation until a manual release has been actuated, thus preventing undesired engagement of the clutch when the engine is again started, in the event that the transmission, to which the driven shaft 2 is connected, has not been placed in neutral.

The foregoing is accomplished by the provision of a pair of centrifugal pawls 12, pivotally mounted between the end of the hub 5 and a plate 13 slidably mounted on the shaft 1, the plate 13 being secured to the end of the hub 5 by the studs 14 on which the pawls are mounted. As best shown in Figure 3, the pawls are urged inwardly by means of springs 15, which are overcome by the centrifugal action of the pawls 12 when the hub is rotated.

Assuming that the drive shaft 1 is dead, and the hub 5 has been run back on the worm 4, as shown in Figure 1, the springs 15 will force the dogs inwardly to engage the shaft 1 and abut the inner end of the worm 4, as shown in Figure 1, and indicated in dotted lines in Figure 3. When the pawls are in this position the spring-urged spanner causes the collar 8 to slide over the pawls into engagement with the plate 13, thus preventing the pawls from being projected to clear the worm, as shown in Figures 2 and 3, when the drive shaft 1 is again rotated, all of which results in locking the clutch against operation until the sleeve 8 is slid forwardly by the manual actuation of the spanner, which is accomplished through means of a rod 16, connected with one end of the spanner and extending to the dash, or other convenient place in the vehicle.

When the sleeve 8 is slid forwardly on the hub 5, centrifugal action will then cause the pawls to swing outwardly to the position shown in Figures 2 and 3, thus clearing the worm and permitting the hub 5 to move forwardly on the worm and effect clutching engagement between the clutch members, whereupon the spanner is released and the spring 11 will cause the sleeve 8 to engage the forward face of the pawls 12, as shown in Figure 2. In this position a slight frictional drag is created between the spanner collar 9 and the rotatable parts, due to the tension of the spring 11 upon the spanner lever. This insures reciprocative action of the hub on the worm 4, in the manner heretofore described.

From the foregoing explanation taken in connection with the accompanying drawing, it will be readily seen that a comparatively simple and inexpensive clutch structure has been provided, which not only engages and disengages itself, in the event of relative difference in the speed of the drive and driven shafts, but which will also automatically lock itself against operation in the event the engine is either stopped or stalled, thus preventing undesired engagement of the clutch in the event that the engine is again started and the driven shaft is left in gear. This is particularly advantageous in numerous types of automotive vehicles at the present time, in which the starter and ignition are controlled by a single switch, the starter being automatically actuated when the ignition switch is on.

In instances where the foregoing control of the ignition and starter is not utilized, it is not essential to provide for automatic locking of the clutch, and therefore the centrifugal pawls and manual actuation of the spanner lever 10 may be eliminated without departing from the invention, inasmuch as the automatic actuation of the clutch remains the same, providing for free-wheeling of the vehicle and elimination of manual operation of the clutch.

I claim:—

1. In combination with coaxial driving and driven shafts, a clutch mechanism comprising, a clutch member secured to the driven shaft, a worm carried by the driving shaft, a second clutch member mounted on said worm for longitudinal reciprocative movement in the event of relative difference of speed of said shafts, and means for automatically locking said reciprocating clutch member against longitudinal movement when rotation of the driving shaft ceases.

2. In combination with coaxial driving and driven shafts, a clutch mechanism comprising, a clutch member secured to the driven shaft, a worm carried by the driving shaft, a second clutch member mounted on said worm for longitudinal reciprocative movement in the event of relative difference of speed of said shafts, and centrifugal means carried by said reciprocating clutch member for automatically locking the same against longitudinal movement when rotation of the drive shaft ceases.

3. In combination with coaxial driving and driven shafts, a clutch mechanism comprising a clutch member secured to the driven shaft, a worm carried by the driving shaft, and unitary means for creating a drag on said reciprocating clutch member and for automatically locking said reciprocating clutch member against longitudinal movement when rotation of the drive shaft ceases.

4. The combination with coaxial driving and driven shafts, a clutch mechanism comprising, a clutch member secured to the driven shaft, a worm carried by the driving shaft, a second clutch member threaded on said worm for longitudinal reciprocative movement, centrifugal means carried by said reciprocating clutch member for automatically locking the same against longitudinal movement when rotation of the drive shaft ceases, and manual control means for releasing said centrifugal locking means.

5. The combination with coaxial driving and driven shafts, a clutch mechanism comprising, a clutch member secured to the driven shaft, a worm carried by the driving shaft, a hub threaded on said worm for longitudinal reciprocative movement, a second clutch member carried by the said hub for clutching engagement with the first mentioned clutch member, a centrifugal pawl carried by said hub for locking the same against longitudinal movement when rotation of the drive shaft ceases, a slidable collar mounted on said hub for retaining said pawls in locking position, and means for manually actuating said collar to release said pawls.

6. The combination with coaxial driving and driven shafts, a clutch mechanism comprising, a clutch member secured to the driven shaft, a worm carried by the driving shaft, a hub threaded on said worm for longitudinal reciprocative movement, a second clutch member carried by the said hub for clutching engagement with the first mentioned clutch member, a centrifugal pawl carried by said hub for locking the same against longitudinal movement when rotation of the drive shaft ceases, a slidable collar mounted on said hub for retaining said pawls in locking position, means for manually actuating said collar to release said pawls, and resilient means for urging said collar to retaining position.

ALEXANDER J. NOWAK.